(12) United States Patent
Feldmann

(10) Patent No.: US 9,963,993 B2
(45) Date of Patent: May 8, 2018

(54) TURBINE RING AND TURBOMACHINE

(71) Applicant: MTU Aero Engines AG, Munich (DE)

(72) Inventor: Manfred Feldmann, Eichenau (DE)

(73) Assignee: MTU Aero Engines AG, Munich (DE)

( * ) Notice: Subject to any disclaimer, the term of this patent is extended or adjusted under 35 U.S.C. 154(b) by 1199 days.

(21) Appl. No.: 14/066,121

(22) Filed: Oct. 29, 2013

(65) Prior Publication Data

US 2017/0350270 A1 Dec. 7, 2017

(30) Foreign Application Priority Data

Oct. 30, 2012 (EP) ..................... 12190481

(51) Int. Cl.
| | |
|---|---|
| F01D 11/08 | (2006.01) |
| F01D 11/18 | (2006.01) |
| F01D 25/24 | (2006.01) |
| F16J 15/44 | (2006.01) |

(52) U.S. Cl.
CPC ............ F01D 11/18 (2013.01); F01D 25/246 (2013.01); *F05D 2220/32* (2013.01); *F05D 2240/11* (2013.01); *F05D 2240/55* (2013.01); *F16J 15/445* (2013.01)

(58) Field of Classification Search
CPC . F01D 11/24; F01D 11/08; F01D 9/00; F01D 9/02; F01D 9/04; F01D 25/24; F01D 25/246; F01D 25/26
See application file for complete search history.

(56) References Cited

U.S. PATENT DOCUMENTS

| | | | | |
|---|---|---|---|---|
| 2,638,743 | A | * | 5/1953 | Feilden ..................... F01D 9/04 415/116 |
| 5,456,576 | A | | 10/1995 | Lyon et al. |
| 5,616,003 | A | | 4/1997 | Charbonnel et al. |
| 6,537,020 | B2 | | 3/2003 | Humhauser |
| 8,061,965 | B2 | | 11/2011 | Daeubler |

FOREIGN PATENT DOCUMENTS

| | | |
|---|---|---|
| DE | 3018621 | 12/1981 |
| DE | 69415765 | 7/1999 |
| DE | 102004010236 | 9/2005 |
| EP | 1149985 | 10/2001 |
| GB | 2076067 | 9/1983 |

* cited by examiner

*Primary Examiner* — Richard Edgar
(74) *Attorney, Agent, or Firm* — Davidson, Davidson & Kappel, LLC

(57) ABSTRACT

A turbine ring of a turbomachine is described, having a one-piece ring structure which has an outer ring which is continuous in the circumferential direction of the turbine ring and has a fastening section for fastening the turbine ring on a housing section of the turbomachine, an inner ring which is segmented in the circumferential direction and has a plurality of inner ring segments which are mutually displaceable in the circumferential direction for guiding the hot gas and has front sealing segments and rear sealing segments, as seen in the axial direction of the turbine ring, these sealing segments being spaced a distance apart from one another in the axial direction and extending between the inner ring and the outer ring, as well as a turbomachine having such a turbine ring.

19 Claims, 5 Drawing Sheets

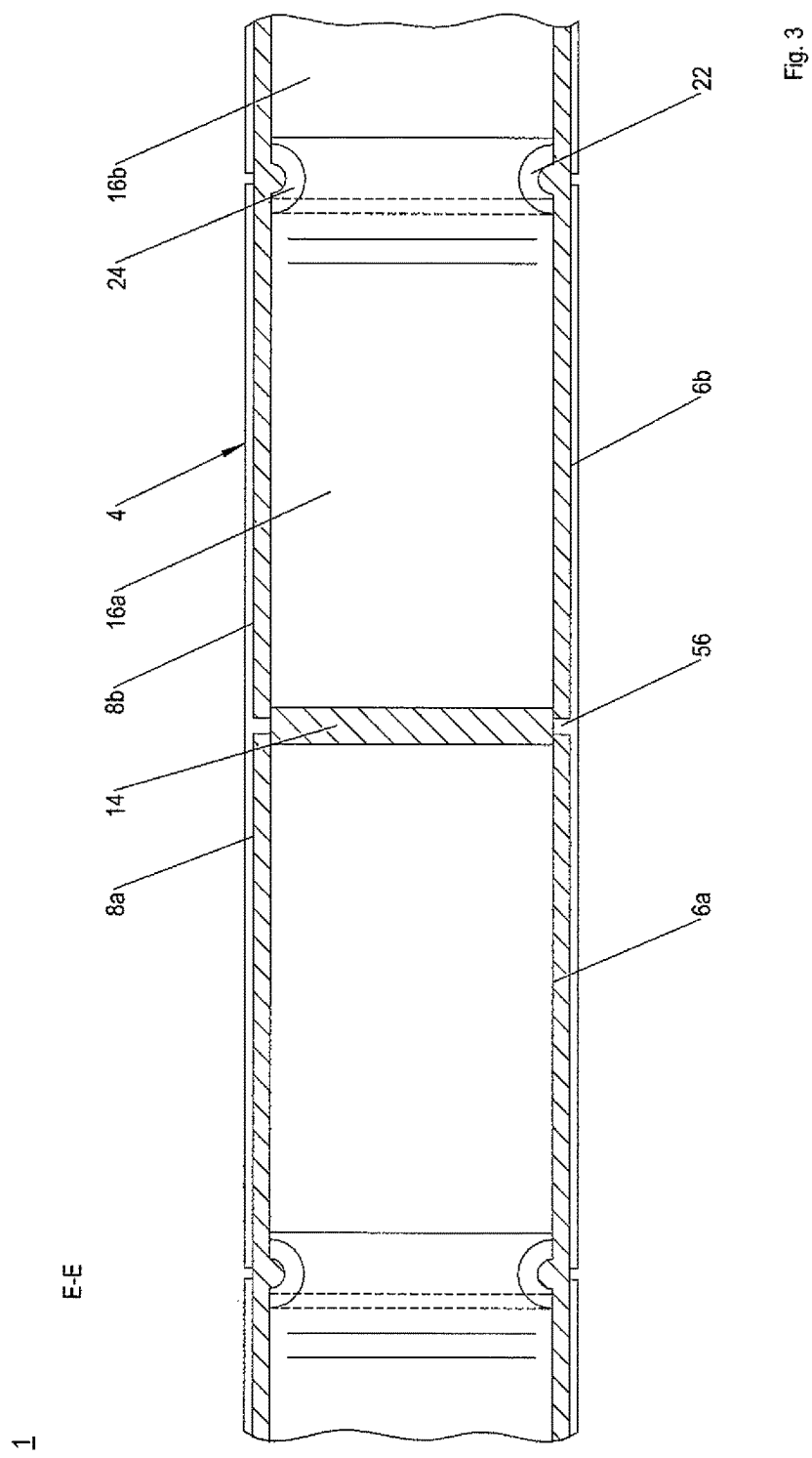

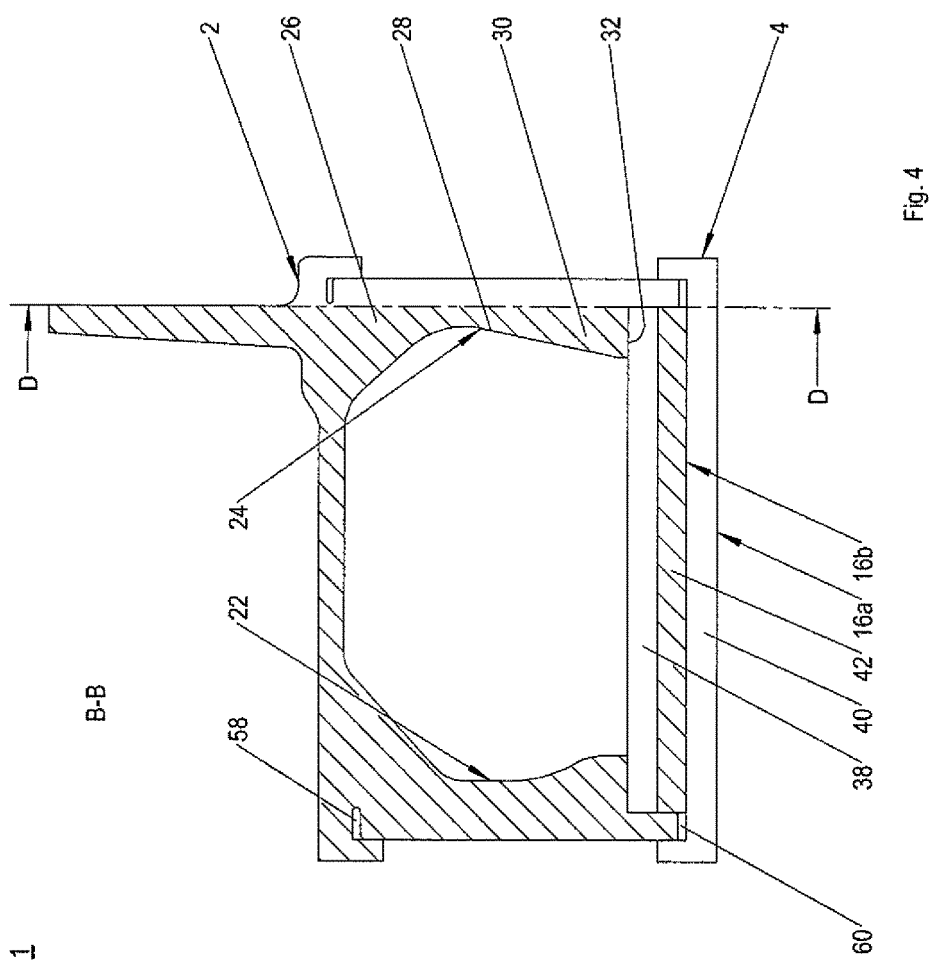

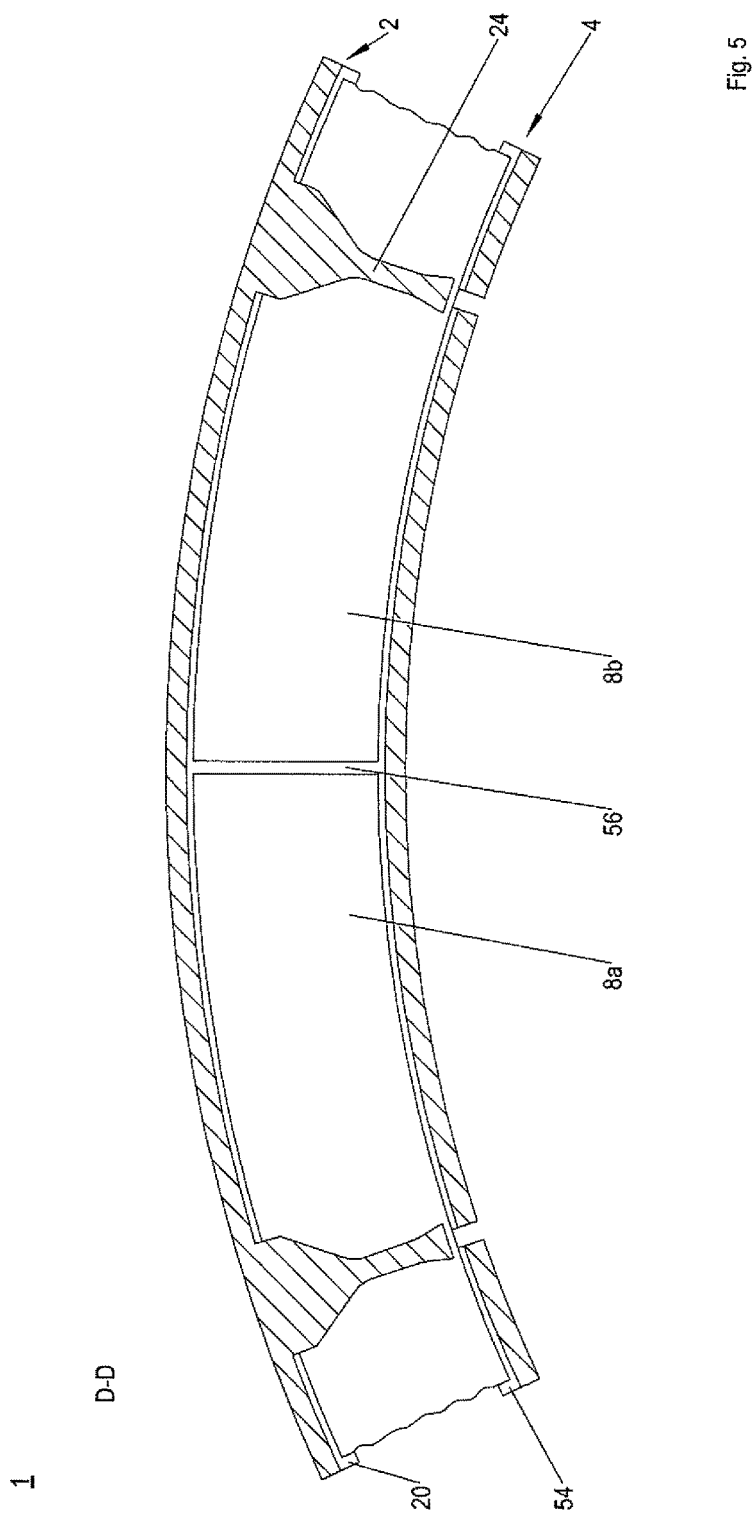

TURBINE RING AND TURBOMACHINE

This claims the benefit of European Patent Application EP 12190481.7, filed Oct. 30, 2013 and hereby incorporated by reference herein.

The present invention relates to a turbine ring of a turbomachine and a turbomachine.

BACKGROUND

In turbomachines such as stationary gas turbines or aircraft engines, it is necessary to create an equalization for the great difference in thermal growth of the components due to high temperature differences between components and component sections near the hot gas and components and component sections near the housing.

Exemplary components include turbine rings, which are usually situated on the housing and delimit a tip gap to opposing moving blade tips. Turbine rings of an integral design are usually spoke-centered, in that they are supported in radial guides on the housing and are thus able to expand freely when heated. However, it has been found that the great radial expansion of the turbine rings differ significantly from the behavior of the rotors during heating, so the tip gap becomes greater and thus turbine efficiency worsens. From a cost standpoint, however, manufacturing of the integral turbine rings is advantageous because of the reduced number of parts.

Equalization of thermal growth in segmented turbine rings is usually ensured by circumferential gaps. The turbine rings are fastened onto the housing but are able to expand freely in the circumferential direction. A radial expansion imposed on the turbine rings by the housing corresponds more to the behavior of the rotors, so that a smaller tip gap and consequently a better efficiency are achieved. To prevent leakage gaps between neighboring ring segments, their butt joints must be sealed. However, the plurality of ring segments as well as the seals increase the manufacturing complexity and thus also increase the manufacturing costs.

SUMMARY OF THE INVENTION

It is an object of the present invention to provide a turbine ring of a turbomachine, which will eliminate the aforementioned disadvantages and will permit a precise tip gap. In addition, another object of the present invention is to create a turbomachine having an improved efficiency.

The present invention provides a turbine ring of a turbomachine having a one-piece ring structure having an outer ring which is continuous in the circumferential direction of the turbine ring and a fastening section for fastening the turbine ring on a housing section of the turbomachine, an inner ring which is segmented in the circumferential direction and has a plurality of inner ring segments for guiding the hot gas and has front sealing segments as seen in the axial direction of the turbine ring and rear sealing segments which are spaced a distance apart from one another in the axial direction and extend radially between the inner ring and the outer ring.

Such a turbine ring allows hot gas guidance with radial thermal expansion of the cooler outer ring, which results in a more precise tip performance in all operating states of a turbine. The inner ring segments, which are on the hot gas end and are therefore hot themselves, may expand freely in the circumferential direction without transferring their thermal expansion to the outer ring, which is remote from the hot gas and is therefore cool. The turbine ring is preferably manufactured generatively by laser sintering or selective laser melting (SLM), for example. Generative manufacturing permits a flexible turbine ring geometry and is also technologically reliable. Furthermore, a turbine ring manufactured in this way is inexpensive due to the one-piece design.

The inner ring segments are preferably each connected to the outer ring with the aid of a radial connecting element. Due to the individual fastening of each individual inner ring segment on the outer ring in the radial direction, a precise alignment of the inner ring segments in the radial direction and in the circumferential direction to one another is possible. The inner rings are therefore fastened individually directly to the outer ring and thus are not fastened onto the inner ring segments indirectly via neighboring inner ring segments.

The at least one connecting element in the circumferential direction is preferably positioned centrally on the inner ring segments. This results in a symmetrical connection of the inner ring segments, which permits a uniform thermal expansion of inner ring segment halves extending laterally from the connecting element. Alternatively, the inner ring segments and the connecting elements are positioned asymmetrically in relation to one another. The connecting elements per se have particularly thin walls to minimize the temperature gradient from the inner ring to the outer ring. In one exemplary embodiment, the connecting elements are plate-type wall elements having a constant wall thickness extending in the axial direction.

To permit free expansion of the inner ring segments in the circumferential direction and at the same time to prevent or impede the development of leakage flows through the neighboring inner ring segments, neighboring inner ring segments may form overlap butt joints. The overlap butt joints preferably have a labyrinthine design, thus creating a plurality of sealing surfaces in the radial direction.

To prevent tilting and/or pivoting of the inner ring segments about the connecting elements and thus about their longitudinal axis in thermal elongation of the connecting elements, a counterholder, which preferably extends from the outer ring in the direction of the inner ring segments, may be positioned in the butt joint area of the inner ring segments. The counterholders have a preferred extent in the radial direction, in such a way that the inner ring segments in the non-elongated state of the connecting elements are in contact with the latter or are only a minimal distance away from them. Alternatively, the counterholders may extend from the inner ring segments in the direction of the outer ring and may be in contact with it in the non-elongated state of the connecting elements or may be only a minimal distance away.

Two counterholders spaced a distance apart from one another in the axial direction are preferably provided in the butt joint areas. This prevents twisting of the inner ring segments during expansion about their transverse axis extending in the circumferential direction. The sealing segments preferably extend from the counterholders, with a radial gap being formed between the sealing segments and the outer ring as well as the inner ring. The sealing segments may expand freely in the circumferential direction due to the radial spacing, but at the same time they are securely positioned on the turbine ring due to the extent of the counterholders.

To prevent leakage gaps due to the radial spacing of the sealing segments from the outer ring and the inner ring, it is advantageous if the sealing segments are guided in circumferential grooves on the outer ring and the inner ring at the edges. Due to the accommodation of the sealing segments in the circumferential grooves at the edge, overlaps and deflections are formed, with the aid of which the formation of leakage flows between the sealing segments and the outer ring as well as the inner ring is effectively suppressed.

To permit free expansion of the sealing segments in the circumferential direction, it is advantageous if a circumferential gap is formed between neighboring sealing segments. To prevent leakage flows through the circumferential gaps, it is advantageous if they are positioned in the area of the connecting elements and if the sealing segments are in contact with the connecting elements. A seal which tightly seals the respective circumferential gap is formed by the overlaps of the sealing segments with the connecting elements.

A turbomachine according to the present invention has at least one turbine ring according to the present invention. Because of the optimized and in particular minimal tip gaps in all operating ranges between the turbine ring and the moving blade tips, improved aerodynamics of the turbomachine and of the turbine in particular and thus a higher turbine efficiency are achieved in comparison with a turbomachine having a traditional turbine ring.

BRIEF DESCRIPTION OF THE DRAWINGS

A preferred exemplary embodiment of the present invention is explained in greater detail below on the basis of schematic diagrams.

FIG. 3 shows a section along line E-E in FIG. 1, FIG. 4 shows a section along line B-B in FIG. 1, and FIG. 5 shows a partial cross section through the turbine ring according to the present invention downstream from the partial section in FIG. 1 and a section along line D-D in FIG. 4.

DETAILED DESCRIPTION

FIGS. 1 through 5 show partial sections through an exemplary embodiment of a turbine ring 1 of a turbomachine according to the present invention, such as a stationary gas turbine or an aircraft engine. Turbine ring 1 is mounted on the housing and forms a minimal tip gap to opposing moving blade tips. It has a one-piece ring structure, which is manufactured in one step by a generative manufacturing method such as laser sintering or laser melting, for example.

Figure 1:
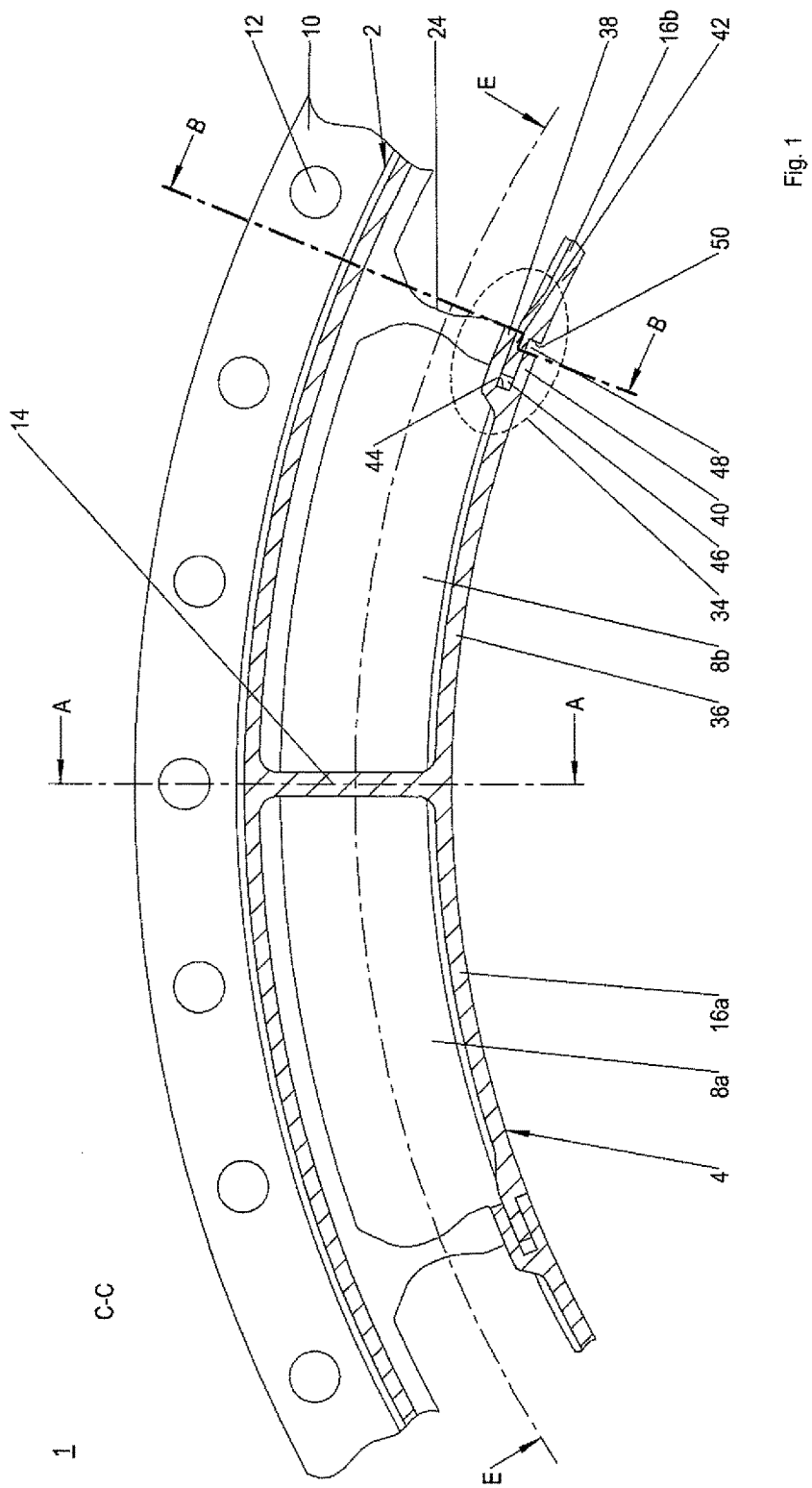
FIG. 1 shows a partial cross section through a turbine ring according to the present invention and a section along line C-C in FIG. 2.
Figure 2:
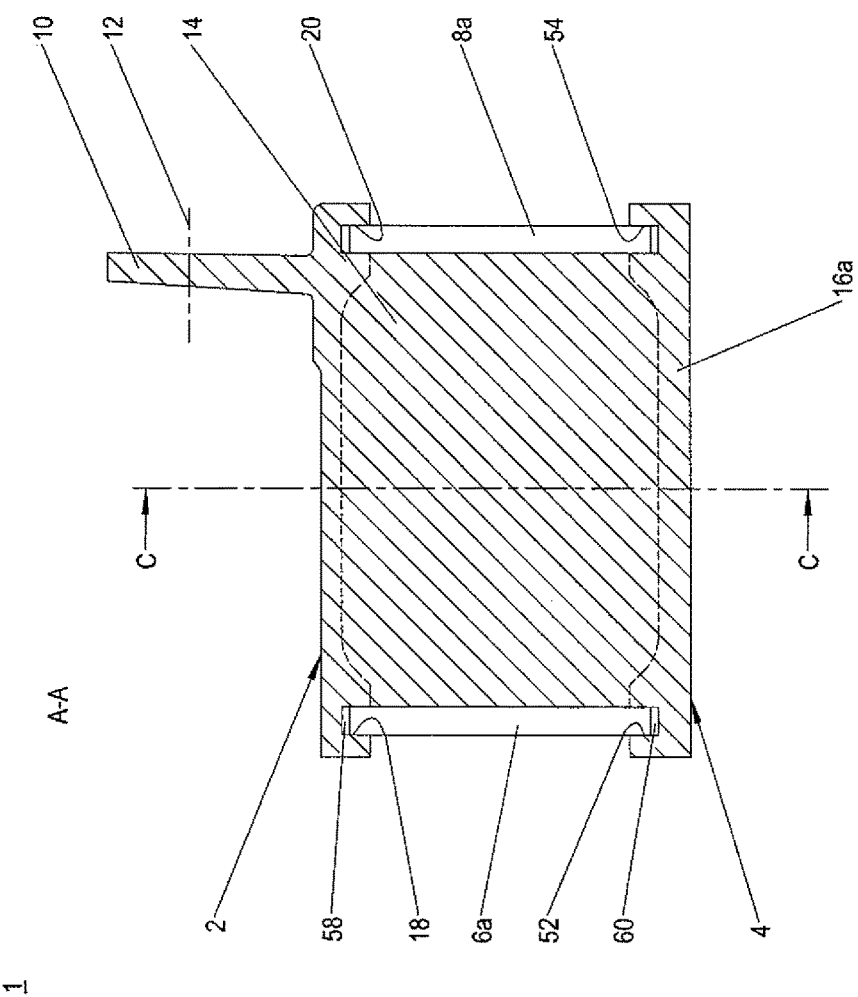
FIG. 2 shows a section along line A-A in FIG. 1.

As is apparent in FIGS. 1, 2 and 3, turbine ring 1 and its ring structure have an outer ring 2, which is continuous in the circumferential direction of turbine ring 1, an inner ring 4, which is segmented in the circumferential direction, and a plurality of front sealing segments 6a, 6b and rear sealing segments 8a, 8b, as seen in the axial direction of turbine ring 1.

Outer ring 2 is closed in the circumferential direction and thus over an angle of 360°. It has a fastening section 10 for connection to a housing section, which is designed in the exemplary embodiment shown here as a ring flange facing radially outward and having a plurality of receptacles 12 through which fastening means such as screws are passed. Outer ring 2 has a plurality of connecting elements 14 with the aid of which an inner ring segment 16a, 16b of inner ring 4 is connected to outer ring 2 in each case.

Connecting elements 14 extend radially inward from outer ring 2 in the direction of inner ring 4 and are formed with a constant wall thickness like a wall or a plate in the exemplary embodiment shown here. They preferably but not necessarily extend over almost the entire axial length of turbine ring 1. Turbine ring 1 is thus subdivided into a plurality of chambers separated fluidically from one another in the circumferential direction. However, for fluidic connection of the chambers, for example, for conducting a cooling air stream through the chambers in the circumferential direction, connecting elements 14 may also be provided with cooling air openings or may be designed like ribs or webs. To permit a cooling air stream to enter into the chambers in the radial direction, outer ring 2 may be provided with corresponding cooling air openings or may be in the form of a skeleton.

Furthermore, outer ring 2 has a peripheral front circumferential groove 18 and a peripheral rear circumferential groove 20. Circumferential grooves 18, 20 each open radially inward and are spaced a distance apart from one another in the axial direction with the aid of connecting elements 14. They are used in particular to seal a leakage gap between outer ring 2 and sealing elements 6a, 6b and 8a, 8b.

According to FIG. 1, outer ring 2 additionally has a plurality of counterholders 22, 24. Counterholders 22, 24 are used for supporting inner ring segments 16a, 16b during thermal expansion and in particular for stabilizing inner ring segments 16a, 16b about their longitudinal axis extending in the axial direction during thermal expansion of connecting elements 14. As is apparent in FIGS. 3 and 4, counterholders 22, 24 are spaced a distance apart from one another in the axial direction of turbine ring 1 and are preferably situated in the area of circumferential grooves 18, 20, so that these are more or less segmented. Counterholders 22, 24 in particular are positioned in the butt joint area of corresponding neighboring inner ring segments 16a, 16b. They have a widened root section 26, with the aid of which they are connected to outer ring 2, a tapering central section 28 and a widened head section 30 having a contact surface 32 facing in the direction of inner ring segments 16a, 16b. Counterholders 22, 24 and connecting elements 14 are preferably distributed uniformly in alternation in the circumferential direction of turbine ring 1.

Inner ring 4 is used for conducting hot gas. It is situated on the inside radially in relation to outer ring 2 and has a plurality of inner ring segments 16a, 16b, as is apparent in FIG. 1, which are each connected to one another by an overlap butt joint 34 in a fluid-tight manner. Inner ring segments 16a, 16b are each curved plate elements extending on both sides, preferably in equal amounts on both sides away from connecting elements 14 in the circumferential direction. Inner ring segments 16a, 16b are thus preferably connected centrally to connecting elements 14. The number of inner ring segments 16a, 16b is ≥2. Inner ring 4 preferably has at least five inner ring segments 16a, 16b. One inner ring segment 16a, 16b is preferably connected to one connecting element 14 in each case.

Overlap butt joints 34 are designed to form a tip gap, in such a way that inner ring segments 16a, 16b form a more or less continuous hot gas ring surface 36 facing the moving blade tips and having a constant inside radius. Hot gas ring surface 36 may be provided with an inlet coating or with inlet linings which the moving blade tips are able to enter. Overlap butt joints 34 are each formed by a fork-like end area having two fork sections 38, 40 spaced a distance apart from one another across a longitudinal groove, which is not labeled with a numeral; these are sections of one inner ring segment 16a and an opposing end section 42, which is set back radially toward the inside, of a neighboring inner ring segment 16b. End section 42 extends into the longitudinal groove and is in fluid-tight contact with fork sections 38, 40 in the radial direction of turbine ring 1. To permit free thermal expansion of inner ring segments 16a, 16b in the circumferential direction, on the one hand, end section 42 is spaced a distance apart from groove base 44 of the longitudinal groove via a circumferential gap 46. On the other hand, radially inner fork section 40 is therefore spaced a distance apart from an opposing longitudinal side 50 of neighboring inner ring segment 16b via a circumferential gap 48.

As shown in FIG. 2, inner ring segments 16a, 16b also have a front circumferential groove section 52 and a rear circumferential groove section 54. Circumferential groove sections 52, 54 are each open radially to the outside and are situated radially opposite circumferential grooves 18, 20 of outer ring 2. On the whole, circumferential groove sections 52, 54 form a peripheral front ring groove and a rear ring groove. Circumferential groove sections and ring grooves 52, 54 are used in particular to seal a leakage gap between inner ring 4 and sealing segments 6a, 6b and 8a, 8b.

Sealing segments 6a, 6b, 8a, 8b are curved plate-shaped bodies according to FIG. 5. In the circumferential direction, sealing segments 6a, 6b, 8a, 8b each extend halfway from a counterholder 22, 24 in the direction of connecting elements 14. Sealing segments 6a, 6b, 8a, 8b are thus each positioned centrally on counterholders 22, 24. They are spaced a distance apart from one another in the area of connecting elements 14 via a circumferential gap 56 which extends in the radial direction. To prevent a leakage flow through circumferential gap 56 into the chambers of the turbine ring, as shown in FIG. 2, the butt joints of sealing segments 6a, 6b and 8a, 8b are positioned in the areas of connecting elements 14, in such a way that sealing segments 6a, 6b and 8a, 8b are each situated so they overlap with connecting elements 14 at the ends.

Sealing segments 6a, 6b, 8a 8b according to FIG. 2 are guided in the radial direction in opposing circumferential grooves 18, 52 and 20, 54 of outer ring 2 and of inner ring 4 and are thereby each spaced a distance apart from the base of the groove (unnumbered) in the radial direction. This forms a radially outer radial gap 58 and a radially inner radial gap 60, which permits free radial expansion of sealing segments 6a, 6b, 8a, 8b. In the axial direction, sealing segments 6a, 6b, 8a, 8b are preferably in fluid-tight contact with unnumbered groove walls.

To permit a cooling air stream through turbine ring 1 in the axial direction or into the chambers, sealing segments 6a, 6b, 8a, 8b may be provided with corresponding cooling air openings or may be in the form of ribs or webs.

When installed in a turbomachine, turbine ring 1 is fastened statically via its fastening section 10 on a housing section of the turbomachine. During operation of the turbomachine, inner ring 4 or its inner ring segments 16a, 16b heat up to a greater extent than outer ring 2. Hot inner ring segments 16a, 16b expand in the circumferential direction, preventing them from running onto the neighboring inner ring segment 16a, 16b due to circumferential gaps 46, 48. At the same time, neighboring inner ring segments 16a, 16b are closed fluidically in the radial direction via labyrinthine overlap butt joints 34.

Inner ring segments 16a, 16b are supported by counterholders 22, 24 about their longitudinal axis. Inner fork sections 38 in particular are supported on their contact surfaces 32 so that inner ring segments 16a, 16b are stabilized about their longitudinal axis during expansion in the circumferential direction.

A transfer of the peripheral expansion of inner ring segments 16a, 16b to outer ring 2 is prevented by the connection of inner ring segments 16a, 16b to outer ring 2 with the aid of connecting elements 14. Furthermore, there is little or no input of heat from inner ring segments 16a, 16b into outer ring 2 due to the radial distance of inner ring segments 16a, 16b from outer ring 2 in combination with connecting elements 14 which are narrow in comparison with inner ring segments 16a, 16b. There is therefore a high temperature gradient between the inner ring 4 and outer ring 2.

Outer ring 2 thus remains much cooler than inner ring 4 and thus has a much lower thermal expansion behavior. Expansion of outer ring 2 in the circumferential direction is almost negligible, inner ring 4 being displaced in the radial direction by the radial elongation of connecting elements 14, in such a way that a minimal tip gap is established to the moving blade tips in all operating states. Overlap butt joints 34 thus equalize the changed radial position of inner ring segments 16a, 16b, so that inner ring segments 16a, 16b are not biased with respect to one another due to the thermal expansion of connecting elements 14.

Sealing segments 6a, 6b, 8a, 8b seal the chambers of turbine ring 1 in the axial direction and thus in the flow direction of a hot gas stream by being accommodated in circumferential grooves 18, 20, 52, 54. Due to mutual spacing in the circumferential direction and the corresponding radial spacing from outer ring 2 and inner ring 4, sealing segments 6a, 6b, 8a, 8b are able to expand freely thermally, on the one hand, while free expansion of outer ring 2 and inner ring 4 is achieved due to the radial spacing on the other hand.

A turbine ring of a turbomachine is described having a one-piece ring structure, which has an outer ring, which is continuous in the circumferential direction of the turbine ring and has a fastening section for fastening the turbine ring on a housing section of the turbomachine, an inner ring, which is segmented in the circumferential direction and has a plurality of inner ring segments, which are mutually displaceable in the circumferential direction for guiding the hot gas and has front sealing segments and rear sealing segments, as seen in the axial direction of the turbine ring, the sealing segments being spaced a distance apart from one another in the axial direction and extending between the inner ring and the outer ring as well as a turbomachine having such a turbine ring.

LIST OF REFERENCE NUMERALS 1 turbine ring
2 outer ring
4 inner ring
6a, 6b front sealing segment
8a, 8b rear sealing segment
10 fastening section
12 receptacle
14 connecting element
16a, 16b inner ring segments
18 front circumferential groove
20 rear circumferential groove
22 counterholder
24 counterholder
26 root section
28 central section 30 head section
32 contact surface
34 overlap butt joint
36 hot gas ring surface
38 fork section
40 fork section
42 end section
44 groove base
46 circumferential gap
48 circumferential gap
50 longitudinal side
52 front circumferential groove section
54 rear circumferential groove section
56 circumferential gap
58 outer radial gap
60 inner radial gap

What is claimed is:

1. A turbine ring of a turbomachine having a one-piece ring structure, the turbine ring comprising:
    an outer ring continuous in a circumferential direction of the turbine ring and having a fastening section for fastening the turbine ring on a housing section of the turbomachine;
    an inner ring segmented in the circumferential direction and having a plurality of inner ring segments mutually displaceable in the circumferential direction for guiding hot gas; and
    front sealing segments and rear sealing segments, with respect to an axial direction of the turbine ring, the front and rear sealing segments being spaced a distance apart from one another in the axial direction and extending radially between the inner ring and the outer ring, wherein the front and rear sealing segments are in fluid-tight contact with the inner ring and the outer ring.

2. The turbine ring as recited in claim 1 further comprising at least one radial connector, the inner ring segments each connected to the outer ring at least with the aid of the radial connector.

3. The turbine ring as recited in claim 2 wherein the at least one radial connector is positioned centrally on the inner ring segments in the circumferential direction.

4. The turbine ring as recited in claim 1 wherein neighboring inner ring segments each form an overlap butt joint.

5. The turbine ring as recited in claim 4 further comprising at least one counterholder positioned in the butt joint area of the inner ring segments, the counterholder extending from the outer ring in the direction of the inner ring segments.

6. The turbine ring as recited in claim 5 wherein the at least one counterholder includes two counterholders spaced a distance apart from one another in the axial direction in the overlap butt joint areas.

7. The turbine ring as recited in claim 6 wherein the front and rear sealing segments extend away from the counterholders, and a radial gap is formed between the front and rear sealing segments and the outer ring and the inner ring.

8. The turbine ring as recited in claim 7 wherein the front and rear sealing segments are guided in circumferential grooves of the outer ring and of the inner ring.

9. The turbine ring as recited in claim 8 further comprising at least one radial connector, the inner ring segments each connected to the outer ring at least with the aid of the radial connector; and wherein a circumferential gap is formed between neighboring sealing segments in the area of the at least one radial connector.

10. A turbomachine comprising a turbine ring as recited in claim 1.

11. The turbine ring as recited in claim 1 wherein the front and rear sealing segments fluidically seal the outer ring to the inner ring in the axial direction.

12. The turbine ring as recited in claim 1 wherein the front and rear sealing segments are curved plate-shaped bodies.

13. The turbine ring as recited in claim 1 wherein the front and rear sealing segments bound axially at least one fluid chamber between the inner ring and the outer ring.

14. A turbine ring of a turbomachine having a one-piece ring structure, the turbine ring comprising:
    an outer ring continuous in a circumferential direction of the turbine ring and having a fastening section for fastening the turbine ring on a housing section of the turbomachine;
    an inner ring segmented in the circumferential direction and having a plurality of inner ring segments mutually displaceable in the circumferential direction for guiding hot gas; and
    front sealing segments and rear sealing segments, with respect to an axial direction of the turbine ring, the front and rear sealing segments being spaced a distance apart from one another in the axial direction and extending radially between the inner ring and the outer ring, wherein the front and rear sealing segments bound axially at least one fluid chamber between the inner ring and the outer ring.

15. The turbine ring as recited in claim 14 further comprising at least one radial connector, the inner ring segments each connected to the outer ring at least with the aid of the radial connector.

16. The turbine ring as recited in claim 14 wherein the front and rear sealing segments fluidically seal the outer ring to the inner ring in the axial direction.

17. A turbine ring of a turbomachine having a one-piece ring structure, the turbine ring comprising:
    an outer ring continuous in a circumferential direction of the turbine ring and having a fastening section for fastening the turbine ring on a housing section of the turbomachine;
    an inner ring segmented in the circumferential direction and having a plurality of inner ring segments mutually displaceable in the circumferential direction for guiding hot gas; and
    front sealing segments and rear sealing segments, with respect to an axial direction of the turbine ring, the front and rear sealing segments being spaced a distance apart from one another in the axial direction and extending radially between the inner ring and the outer ring, wherein the front and rear sealing segments fluidically seal the outer ring to the inner ring in the axial direction.

18. The turbine ring as recited in claim 17 further comprising at least one radial connector, the inner ring segments each connected to the outer ring at least with the aid of the radial connector.

19. A turbine ring of a turbomachine having a one-piece ring structure, the turbine ring comprising:
    an outer ring continuous in a circumferential direction of the turbine ring and having a fastening section for fastening the turbine ring on a housing section of the turbomachine;
    an inner ring segmented in the circumferential direction and having a plurality of inner ring segments mutually displaceable in the circumferential direction for guiding hot gas;
    front sealing segments and rear sealing segments, with respect to an axial direction of the turbine ring, the front and rear sealing segments being spaced a distance apart from one another in the axial direction and extending radially between the inner ring and the outer ring; and at least one radial connector, the inner ring segments each connected to the outer ring at least with the aid of the radial connector.

* * * * *